June 6, 1933.  W. J. PERKINS  1,912,722
AERIAL AIRCRAFT CARRIER
Filed Aug. 14, 1922   4 Sheets-Sheet 2
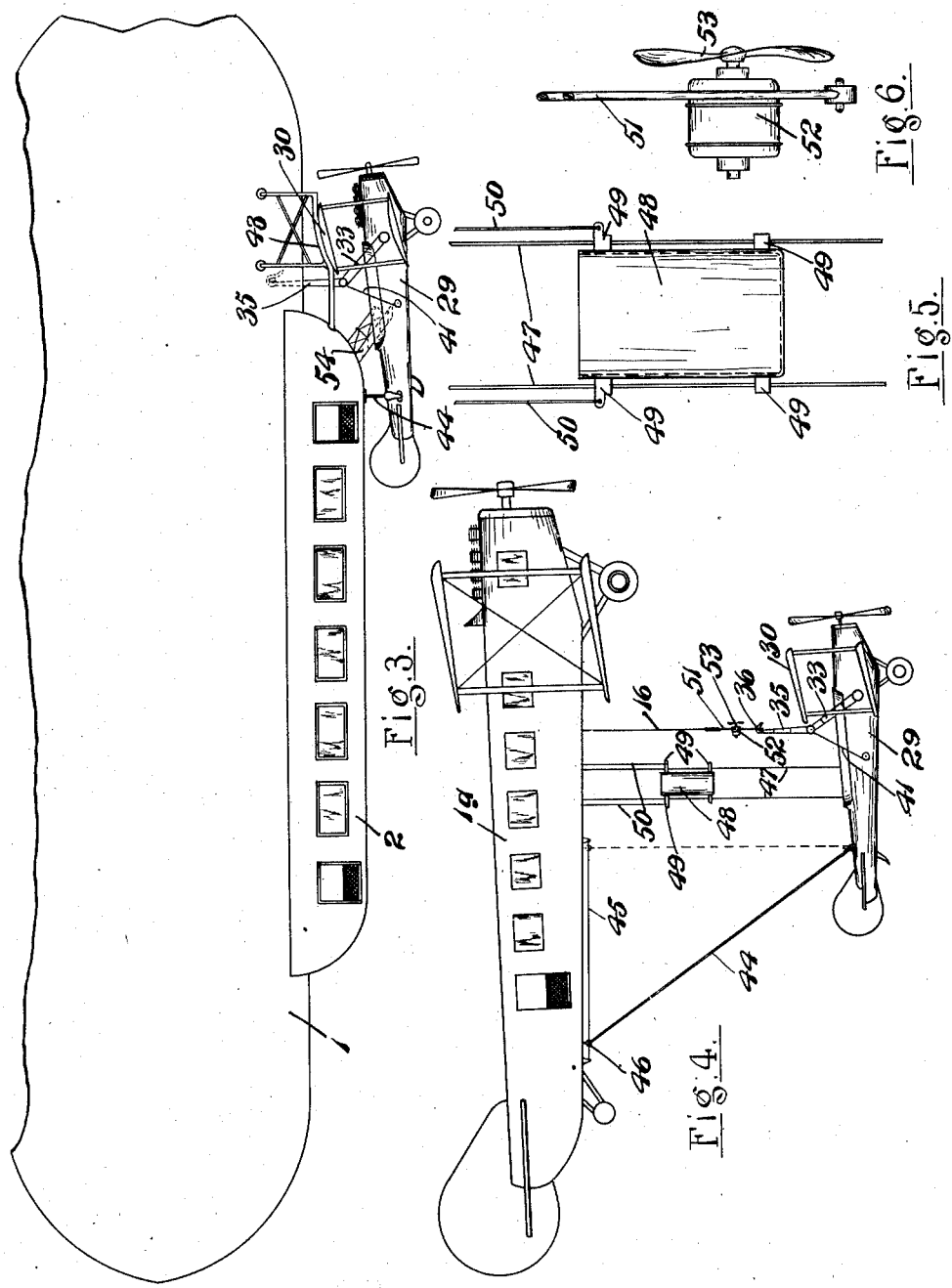
Inventor
Willis J. Perkins
By Frank E. Liverance, Jr.
Attorney.

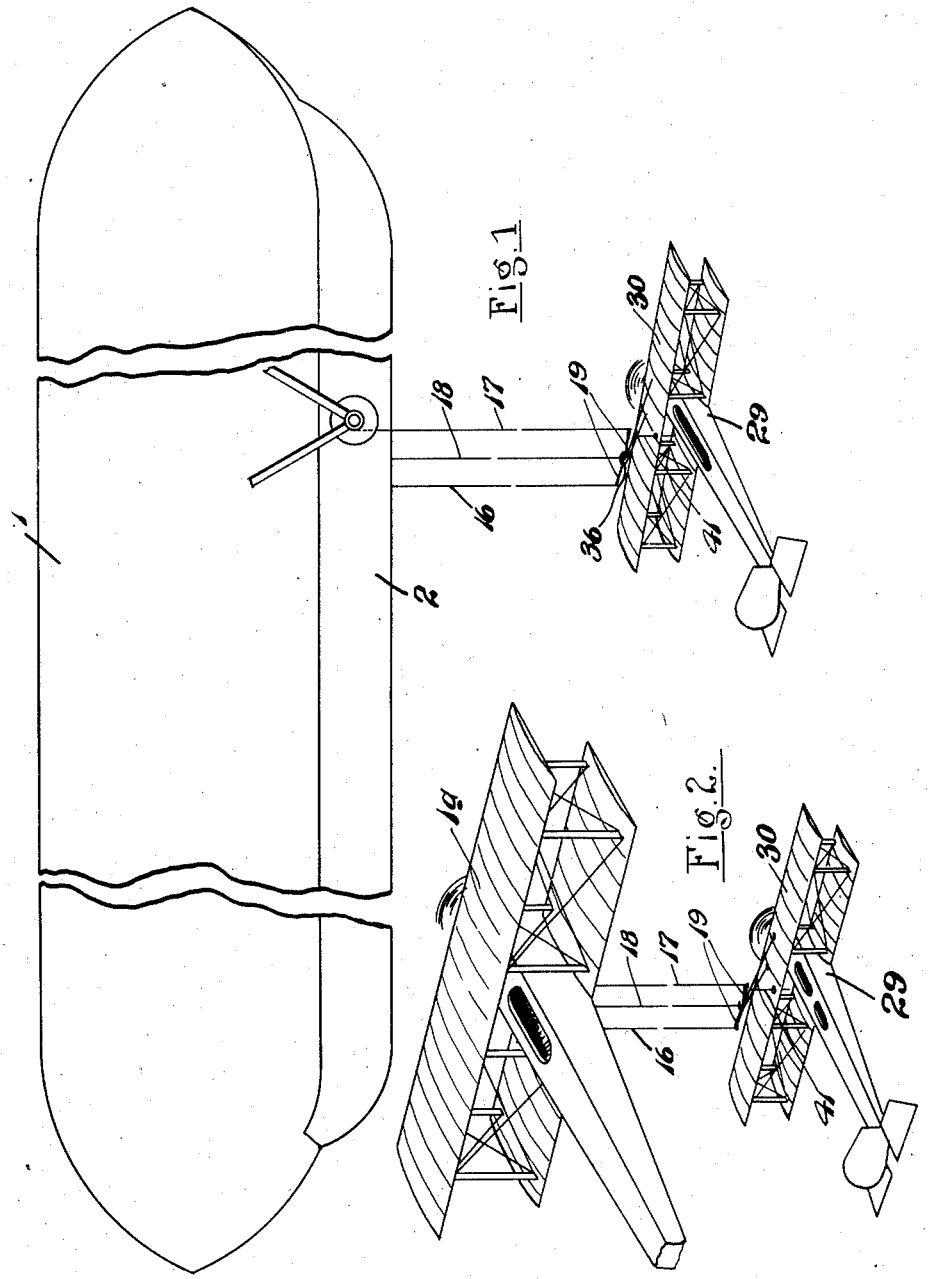

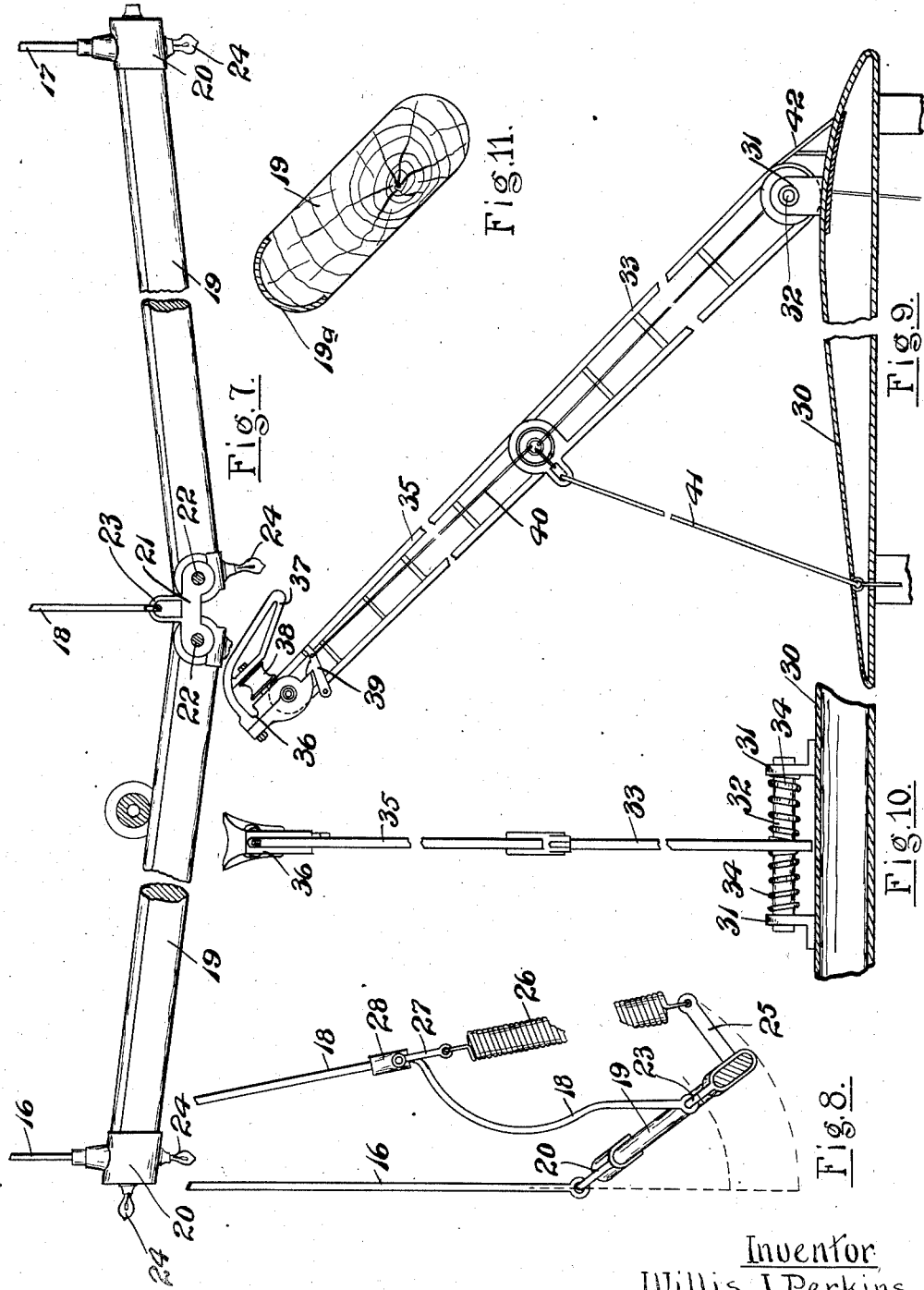

June 6, 1933.  W. J. PERKINS  1,912,722
AERIAL AIRCRAFT CARRIER
Filed Aug. 14, 1922  4 Sheets-Sheet 4
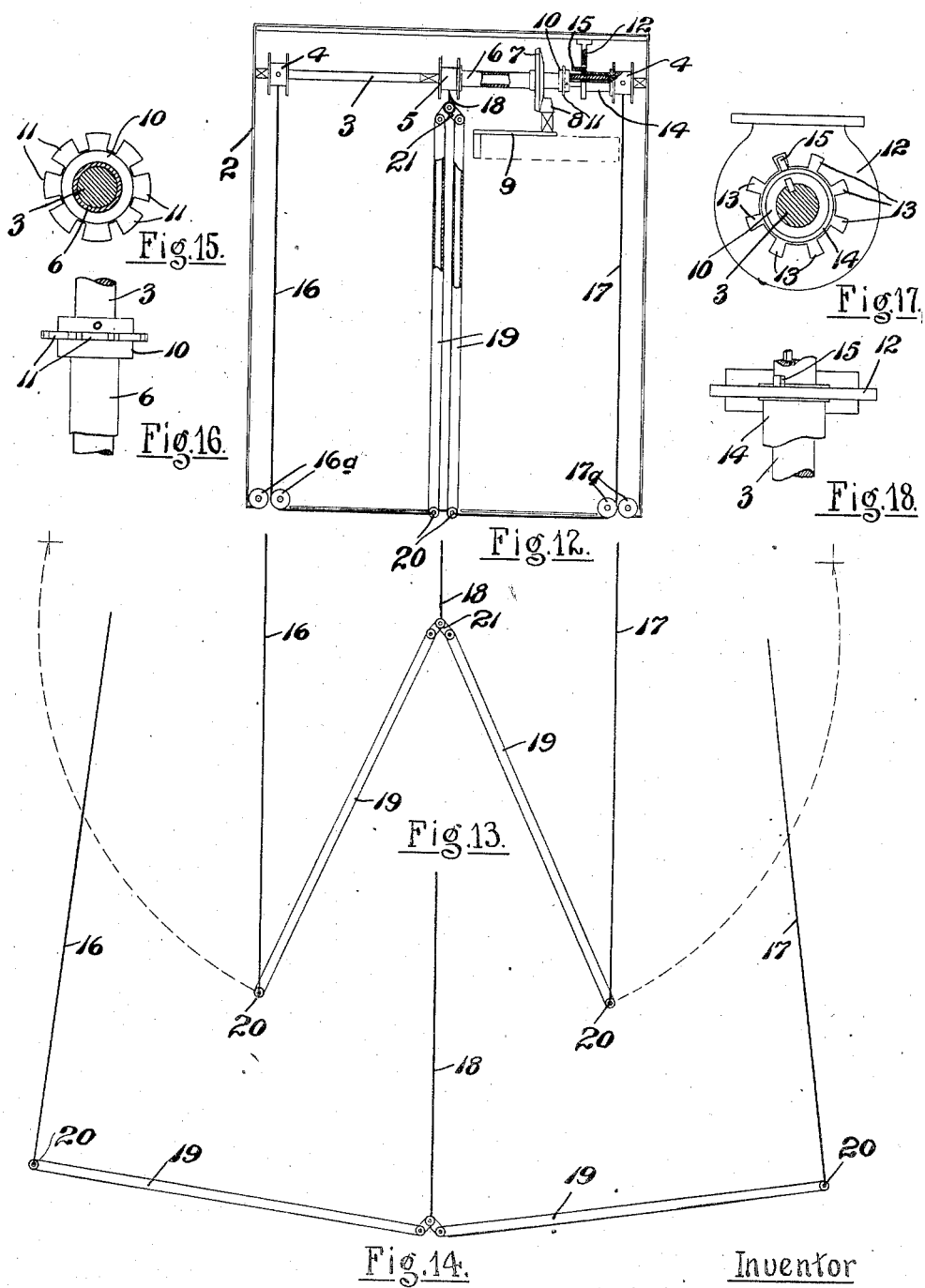
Inventor
Willis J. Perkins
By Frank E. Liverance, Jr.
Attorney.

Patented June 6, 1933

1,912,722

UNITED STATES PATENT OFFICE

WILLIS J. PERKINS, OF GRAND RAPIDS, MICHIGAN, ASSIGNOR TO WILLIS B. PERKINS, JR., AND BURGESS M. KIDDER, BOTH OF GRAND RAPIDS, MICHIGAN

AERIAL AIRCRAFT CARRIER

Application filed August 14, 1922. Serial No. 581,659.

The present invention relates to landings of one aircraft onto another in flight for greater commercial and military air service efficiency. Normally the smaller aircraft will land on a larger aircraft, but it is recognized that occasions may arise where larger aircraft partially disabled or for other purposes, may desire aid from, or connection with smaller aircraft, therefore, the types of aircraft connecting with another whether lighter than air, or heavier than air, and their order of connection as to the smaller landing onto the larger or vice versa is not limited herein, aeronautical experience recognizing the fact, that at flight speed airplanes of heavier than air type have no weight.

In continuous flights of aircraft in routes passing over one or more aviation fields or between widely separated terminals, aircraft used for commercial, postal, or military purposes, of either heavier than air, or lighter than air types, (generally known as airplanes and dirigibles) efficiency in service demands continuous maintained speed, and that such aircraft may discharge and take on their loads in mid air, with safety assured, for attendants, passengers, express, mail, freight, postal, or military supplies, or the like so transferred.

It is designed that landing connections for landing in flight shall be effected with both aircraft moving through the air in the same direction at substantially the same speeds at the time of connection, the relative difference in speed if any, of the two craft making such connection practically without any effect on either aircraft.

With my invention, there is provided a convenient and safe means of landing connection, and likewise of take off or release connections and one of least danger, full visibility, for the pilots of both aircrafts being assured. There is further provided means whereby the commander of the aircraft landed on may determine and control the position between the ends of the aerial aircraft carrier, where the landing aircraft shall make such landing connection and where it shall be parked thereon, together with a like determination as to the time of take off, of the landed crafts, when several are used to serve the aerial aircraft carrier, enroute, or when they shall serve as continuous aircraft taxies throughout the route of the aerial aircraft carrier. All transfers taking place while the aerial aircraft carrier, continues its flight, the serving aircrafts meeting the aerial aircraft carrier in response to its wireless or other instructions starting from the various public or other aviation fields at which they may be stationed or if in flight changing their course to overtake and intercept such signaling aircraft carriers.

A further object of the invention is to make this possibility of landing connection, parking and take off, in a very simple manner and at relatively small expense and as small an equipment as is consistent with safety to the aircrafts, their transferable loads including passengers and attendants, and with a minimum degree of added weight, wind resistance, and taxing of the skill of the pilot to make a proper landing connection.

In the accomplishment of the objects of this invention, I make use of a landing trapeze of a type somewhat similar to those shown in prior applications for patent filed by me, namely, those in Ser. No. 180,787, filed July 16, 1917; Ser. No. 192,101, filed September 19th, 1917; Ser. No. 322,897, filed Sept. 10, 1919; Serial No. 486,971, filed July 23, 1931; and Patent No. 1,738,261, allowed December 3rd, 1929; and others wherein a swinging landing trapeze construction is suspended from a supporting structure with which the aircraft to land is designed to connect, and it is a further object of the present invention to maintain said landing trapeze carried by the aerial aircraft carrier in a relatively vertical position at service times against forces set up by air resistance, speed flight of the aerial aircraft carrier, and the like so that easy landing connection may be made by the other aircraft.

Further objects of the invention, subsidiary to the chief objects, are to provide a means for quickly housing the landing trapeze elements suspended from the larger craft when not in use so that the same need not be suspended except when to be used in landing of aircraft, and parking same thereon; and a means for safely and efficiently making transfer of passengers and attendants or packages and other cargo from one aircraft to the other after connection has been made. All of these objects and purposes with many others not specifically stated at this time, and novel constructions and arrangements of parts for attaining the same will appear as understanding of the invention is had from the following description, taken in connection with the accompanying drawings, in which, Fig. 1 is a diagrammatic elevation of a dirigible having my landing constructions applied thereto, a small heavier than air aircraft being shown making landing connection therewith.

Fig. 2 is a perspective view showing a smaller airplane making landing connection with a larger plane.

Fig. 3 is a fragmentary elevation showing a more complete adaptation of the invention to a dirigible, the smaller craft being in parked position thereon.

Fig. 4 is a side elevation showing the smaller airplane connected with and stabilized with respect to the larger plane and with a means for making transference from one plane to the other.

Fig. 5 is an enlarged elevation of the conveyor transfer means used.

Fig. 6 is a side elevation of the trapeze stabilizing means used to hold it in vertical position.

Fig. 7 is an elevation of the novel form of trapeze landing means used.

Fig. 8 is a transverse vertical section therethrough.

Fig. 9 is an elevation showing the connection of the landing hook construction to the upper plane of the airplane which makes landing connection with another craft.

Fig. 10 is a rear elevation thereof, partly in section.

Fig. 11 is an enlarged transverse section through one of the landing bars of the trapeze.

Fig. 12 is a diagrammatic transverse section through the cabin of a dirigible, illustrating the means used to house the trapeze within the cabin when not in use, the same construction being applicable to the fuselage of an airplane.

Figs. 13 and 14 are elevations showing the stages of progress in the unfolding of the trapeze from its housed position in the cabin to suspended operative position below the cabin.

Fig. 15 is a transverse section and Fig. 16 is a plan view illustrating a detail of construction with reference to the handling of the housing of the trapeze in the cabin, and Fig. 17 is a transverse section and Fig. 18 an under plan of a second detail of construction relating to the same.

Life reference characters refer to like parts in the several figures of the drawings.

In the drawings, a conventional dirigible is indicated at 1, having a cabin 2 at its lower side as the structure is applicable, as well to the fuselage of an airplane, the cabin is to be considered as the fuselage of the plane when the invention is applied to airplanes. Between the vertical sides of the cabin, a shaft 3 may be mounted horizontally in suitable bearings, adjacent the ends of which drums 4 are secured. It is to be understood that there may be a plurality of these shafts and landing trapeze associated therewith in the length of the cabin, but that a description of the constructions pertaining to one will suffice for all. A third drum 5 is located near the middle of the shaft 3, having attachment to a sleeve 6 loosely mounted on one end portion of the shaft. A bevelled gear 7 is keyed or otherwise permanently secured to the sleeve between its ends, with which a pinion 8 is in mesh, adapted to be manually driven by a crank 9, the pinion shaft being suitably mounted in any preferred manner.

A collar 10 is pinned to the sleeve 6 having an annular vane extending therefrom, notched at spaced apart intervals to leave projecting spaced apart fingers 11, as shown. A bracket 12 is fixed to the top of the cabin adjacent the point of location of the collar 10 and has an enlarged depending section with an opening to pass shaft 3, sleeve 14 with its projecting flange, the depending section being radially slotted, as indicated at 13 at spaced apart intervals, said slots extending outwardly from the central opening in said depending section, as shown in Fig. 17. An adjustable sleeve 14 has sliding movement on the shaft 3 by means of key 14a fixed in shaft 3, and is provided with a finger 15 adapted to enter either the slots 13 or the slots between fingers 11. When in the first position, sleeve 6 and drum 5 rotate freely on the shaft 3 which is locked against rotation, and in the latter, if the finger 15 is moved far enough to escape from the bracket 12, the shaft 3 and sleeve 6 are locked together for rotation. By stopping in an intermediate position, with finger 15 in slots 13 and between two of the fingers 11, the entire structure is locked against rotation. In fact drums 4 and 5 may be made to turn together, or all locked against rotation, or drum 5 rotated with drums 4 locked against rotation.

Lines 16 and 17 are attached to and depend from the drums 4 passing between pairs of idle pulleys 16a and 17a in the floor of the cabin. A third line 18 is attached to and depends from drum 5. The lines 16 and 17 at their lower ends are connected to the outer ends of two trapeze bars 19, any suitable connection, such as indicated at 20 being used. The bars may be of wood, at their upper sides having a protective covering 19a of sheet metal (see Fig. 11), or any suitable material such as tubing or solid bar stock. These bars 19 extend toward each other and at their inner ends have pivotal connection at 22 to a center connecting member 21, having a loop 23 at its middle to which the lower end of line 18 is secured. This type of connection permits the folding of the bars 19 in parallel relation to each other when the trapeze is withdrawn into the cabin as shown in Fig. 12, and left in such position or thereafter stored in any suitable manner. The operation of folding or unfolding is illustrated in Figs. 13 and 14, the winding of the lines 18 and 16 and 17 on the drums being controlled properly for this purpose. It is designed that light bulbs 24 may be attached at the ends of the bars 19 for guidance of the pilot of the landing plane at night.

A projecting bar 25 may extend to the side from the center connection 21, substantially at right angles to which one end of a coiled spring 26 is secured, the opposite end being connected to a link 27 in turn secured to a clip 28 fastened to the line 18 a distance above the lower end thereof. This spring has the office of drawing the trapeze bars to one side of the vertical, as shown in Fig. 8, with that part of the line 18 between the clip 28 and loop 23 left slack, the spring yielding when the weight of the landing airplane is brought on to the trapeze and thereby cushioning the impact of landing connection. It will be noted that in normal operative position, the inner ends of bars 19 incline downwardly toward each other for centering the landing plane automatically on the trapeze as will hereafter appear.

The airplane landing on the aerial aircraft carrier, is indicated at 29, and is of conventional construction except for the addition of the landing hook construction for engaging with the trapeze. This construction may be of the type shown in my pending application for patent, Ser. No. 576,959, filed July 24th, 1922, as shown in Figs. 3 and 4 wherein it is attached to the airplane fuselage, or said hook structure may be simplified and attached directly to the upper plane 30 of the plane, as shown in Fig. 9. In such simplified construction, two brackets 31 are secured permanently to the upper side of the upper lifting plane 30 in spaced relation, a shaft 32 rotatably mounted between them, and the lower member 33 of the landing hook construction fixed at its lower end to the shaft, two coiled torsion springs 34 around the shaft connecting at their ends to brackets 31 and the member 33, the tendency of which is to lift the landing hook to an upper position. An extension member 35, pivotally connected to the upper end of member 33, and at its upper end carrying a pivotally mounted block 36 with a hook 37 attached thereto and with a roller 38 between the hook and block, together with a manually operable latch 39 operated by a line 40 leading to a convenient place for access by the pilot, all similar with the construction shown and described in my above noted application, complete the landing hook construction, with the addition of a stop and operating cable 41 from the plane 30 to the upper end of the lower member 33 of such construction. The single landing hook 37, see Figs. 1, 2, 9, and 10 is preferable where landings are only contemplated, but where both ceiling landings and mid-air landings on a trapeze supported on a fixed structure as set forth in pending applications, are to be negotiated the double fuselage supported landing hook as shown in Figs. 3 and 4 of said application No. 576,959 is essential. A guard 42 may be applied to the upper plane 30 at the lower end of the hook construction for insurance against possible undesired connection if desired.

In Figs. 2 and 4, I have shown the trapeze landing device as suspended from a larger airplane 1a, and in either case the landing of one aircraft on the other is accomplished in the same manner. The two aircraft are both moving through the air, the landing craft somewhat faster than the other, and the hook member is allowed to take its elevated position under the influence of springs 34, whereupon the smaller plane is guided so that its hook member engages with the trapeze bars 19 in the manner described fully in my previous applications for patent. It will be understood, that the use of two trapeze bars are for the sole purpose of increasing the length of the landing objective, and proportionately reducing the skill required in negotiating a hooking on landing thereon. It is believed, a single bar of lesser length may answer quite efficiently with relative reduction in number of parts, total weights and aggregate air resistance. The commander of the aerial aircraft carrier may use his judgment as to the distance the trapeze may be lowered and as to which trapeze of several he may use, and as soon as a landing connection has been made, the pilot of the landed craft may reduce the speed of his motor, or maintain its speed, as seems best. The connection with the landing trapeze is relatively easy, there being comparatively small difference in speed between the two aircraft at time of connection. This precludes shocks to the aircraft and as the aerial aircraft carrier on which landing is made is under way in the same direction as the aircraft landed, there is no likelihood that any twisting of the trapeze construction or other untoward event will happen. In fact it is very similar in effect with the transference of a person from one airplane to another, sometimes seen in exhibitions, the chief difference being that plane hooking on to and connecting with aerial aircraft is fully capable by its flight speed of carrying its own weight and withstanding any strains or shocks which may come from such connection.

In Fig. 3, I have shown the airplane landed on the dirigible as drawn up and parked against the under side, a suitable parking device 43, shaped to have the upper plane 30 come thereagainst being provided. There is but one shown, but in the length of the dirigible, many may be used.

When the airplane has made landing connection with the upper aircraft, a line 44 may be dropped from said upper aircraft and connected with the fuselage of the lower craft, whereupon said line may be tightened to swing the fuselage of said lower aircraft into position and hold it there. This is shown in Fig. 4, and in practice one way of tightening the line is to slidably connect the upper end thereof on a horizontal guide 45 secured on the under side of the upper craft, the guide having any suitable device 46 slidably mounted thereon and capable of being secured at different points in its length to which the upper end of line 44 is connected. The action in tightening the line is obvious, bringing the two planes into alinement if they are not already so, and holding them in such relative positions.

When the landing plane has been landed and secured, in order to make transference from one to other of any articles, or of passengers, I have provided a novel form of elevator construction to be used between the two aircraft. Guide lines 47 may be dropped from the upper craft to the lower, and between the same a receptacle 48 may be placed having a plurality of ears 49 extending laterally therefrom through which the lines 47 pass to thereby guide the receptacle in its movements. This receptacle is suspended by lines 50 from the upper craft, and said lines may be played out or drawn in in any suitable manner for the making of trips between the two aircraft and a transference of anything desired from one to the other.

When the trapeze is suspended from the aerial aircraft carrier, there is a tendency for the same to swing backward from air resistance. To obviate this, I may attach a frame 51 at the lower ends of lines 16 and 17 and mount an electric motor 52 thereon, driving a propeller 53, as shown in Figs. 4 and 6, which serves to propel the trapeze forward with the aircraft, as is evident. The use of the propeller is not obligatory as I may depend wholly on the weight of the bar 19.

When the airplane is parked against the dirigible as in Fig. 3, and secured thereto, it is easy to pass from one to the other, making use of any suitable gang plank or the like, indicated at 54.

With a construction as thus described, an effective means is provided for making a landing connection between aircraft when desired. The independent and collective control of the trapeze lines permits a control of the trapeze as to distance below the cabin and as to the downward angle of the trapeze bars 19 with respect to each other. The landing hook automatically moves to lower position chiefly through agency of roller 38 thereby centering the aircraft lengthwise on the trapeze. The take-off from the larger craft is very easily accomplished, through merely unlatching the hook by the means provided when both crafts have reached a required location or all transfers are completed after which the landing hook construction may be drawn to stream line position with reference to the airplane. All of the foregoing features stated and many others apparent make the invention one of practical value and importance.

The invention is defined in the claims appended hereto, and all forms of construction and variations in detail coming within the scope of said claims are to be considered as comprehended by the invention. The structure shown is practical and operative but the specific showing is not to be considered as limiting the invention other than as described by the claims.

I claim:

1. In combination with a relatively large aircraft, a trapeze construction suspended therefrom, and a propeller associated with said trapeze construction for moving the same in the same direction as the flight direction of the aircraft.

2. In combination with a relatively large aircraft, of a shaft mounted horizontally thereon, drums at the ends of the shaft, a third drum loosely mounted on the shaft substantially at the middle thereof, lines around said drums and depending below the aircraft, means for operating said third drum separately or in unison with the other drums, trapeze bars attached at their outer ends to the outside lines, means connecting the bars for pivotal movements with respect to each other at their inner ends, said inner line having connection at its lower end to said connecting means, substantially as described.

3. A trapeze construction for the purposes described, comprising three depending lines, bars connected to the outside lines at their outer ends and extending toward each other, a member to which the inner ends of the bars are connected, and connections between said member and the third line at its lower end.

4. In combination with a relatively large aircraft, having a cabin at its lower side, of a trapeze construction adapted to be suspended from the cabin, including three depending lines, two bars attached at their outer ends to the lower ends of two of the lines, connecting means between the inner ends of the bars to which said bars are pivotally connected, the lower end of the remaining line having connection to said connecting means, means for winding or unwinding the outer lines simultaneously, and separate means for winding and unwinding the third line, whereby the trapeze construction may be raised or lowered with respect to the cabin and housed within the cabin in uppermost position with the bars located vertically alongside of each other.

5. A trapeze construction, comprising two depending spaced apart lines, two bars attached at their outer ends to the lower ends of said lines and extending inwardly toward each other, means connecting the inner ends of the bars to which said bars are pivotally connected, a third line having connection to said means at its lower end, and spring means interposed between said third line and said connecting means and attached thereto tending to swing the trapeze bars to one side out of the plane of said two first mentioned lines.

6. A trapeze construction, comprising two depending spaced apart lines, a bar attached at its outer end to the lower end of each line, means at the inner ends of the bars to which said bars are pivotally connected, a third depending line connected at its lower end to said means, an arm extending at an angle to said means and connected therewith, a spring attached at one end to the arm, and means connecting the upper end of the spring with the third line, thereby swinging the bars to one side out of the plane of said two first mentioned lines but yieldingly permitting movement back to said plane on application of weight to the bars, substantially as described.

7. A construction containing the elements in combination defined in claim 3, in which said bars are of wood, and a metal covering for the upper sides of the bars, substantially as described.

8. A construction containing the elements in combination defined in claim 3, combined with lights connected with the inner and outer ends of the bars, substantially as described.

9. In combination, a support, a shaft mounted horizontally thereon, a drum attached at each end of the shaft, a line depending from each drum and adapted to be wound therearound, a sleeve loosely mounted on the shaft, a drum on the sleeve, a third line depending from said last mentioned drum, and adapted to be wound therearound, means for rotating the sleeve, means for locking the sleeve to the shaft to permit the rotation of the sleeve and shaft together, and a trapeze construction attached to the lower ends of the lines, comprising two bars having pivotal connection at their inner ends and connected to the lower ends of said two first mentioned lines at their outer ends, said third line having connection at its lower end to said bars at their inner ends, substantially as described.

10. A construction containing the elements in combination defined in claim 9, combined with means for locking both the sleeve and shaft against rotation.

11. The combination with a relatively large aircraft, a smaller aircraft, means for effecting a landing connection of the smaller with the larger craft below said larger craft, and an elevating conveyer carried by the larger craft and adapted to be let down to the smaller craft after said connection has been made, substantially as and for the purposes described.

12. An airplane of relatively small size, brackets secured to the upper side of a lifting plane thereof in spaced apart relation, a shaft mounted between the brackets, spring means arranged on the shaft and brackets tending to turn the shaft in one direction, and a landing hook construction secured to the shaft to a point above the plane.

13. In combination with a relatively large aircraft having a cabin related thereto of a trapeze construction adapted to be suspended from the cabin, including three depending lines, two bars attached at their outer ends to the lower ends of two of the lines, connecting means between the inner ends of the bars to which said bars are pivotally connected, the lower end of the remaining line having connection to said connecting means, means for winding or unwinding the outer lines simultaneously, and separate means for winding or unwinding the third line, whereby the trapeze construction may be raised or lowered with respect to the cabin and housed within the cabin.

14. In combination with an aircraft in an upper ceiling, a second aircraft immediately thereunder, means for effecting a landing connection of the lower aircraft with the upper aircraft, said means extending below said upper aircraft and an elevating conveyor carried by the upper aircraft, and adapted to be let down to the lower aircraft after said connection has been made substantially and as for the purpose described.

15. In an airplane, brackets secured to the upper side of the supporting wing thereof in spaced apart relation, a shaft mounted between the brackets, spring means arranged on the shaft and brackets tending to turn the shaft in one direction, and a landing hook construction secured to the shaft and normally elevated in service position by the turning of the shaft to a point above the plane and means located beneath and carried by another airplane for automatic engagement by the said landing hook in flight.

16. In combination with a relatively large aircraft, a trapeze construction suspended therefrom, and a propeller associated with said trapeze construction for moving the same.

In testimony whereof I affix my signature.
WILLIS J. PERKINS.